United States Patent [19]

Lovette et al.

[11] Patent Number: 5,650,450
[45] Date of Patent: Jul. 22, 1997

[54] HYDROPHILIC URETHANE FOAM

[75] Inventors: Joseph W. Lovette, Newark, Del.; Sharon A. Free, Wallingford, Pa.

[73] Assignee: Foamex L.P., Linwood, Pa.

[21] Appl. No.: 591,040

[22] Filed: Jan. 25, 1996

[51] Int. Cl.$^6$ .................................................. C08G 18/10
[52] U.S. Cl. .................... 521/112; 521/159; 521/905; 521/914
[58] Field of Search ................... 521/112, 159, 521/905, 914

[56] References Cited

U.S. PATENT DOCUMENTS

| | | | |
|---|---|---|---|
| 3,594,334 | 7/1971 | Marlin | 260/2.5 |
| 3,889,417 | 6/1975 | Wood et al. | 47/58 |
| 3,961,629 | 6/1976 | Richter et al. | 128/296 |
| 4,049,592 | 9/1977 | Marans et al. | 160/2.5 AD |
| 4,127,516 | 11/1978 | Larsen et al. | 521/137 |
| 4,137,200 | 1/1979 | Wood et al. | 521/159 |
| 4,191,815 | 3/1980 | Jourquin et al. | 521/51 |
| 4,314,034 | 2/1982 | Fulmer et al. | 521/65 |
| 4,365,025 | 12/1982 | Murch et al. | 521/159 |
| 4,603,076 | 7/1986 | Bowditch et al. | 428/246 |
| 4,638,017 | 1/1987 | Larson et al. | 521/157 |
| 4,644,018 | 2/1987 | Bowditch et al. | 521/130 |
| 4,725,628 | 2/1988 | Garvey et al. | 521/137 |
| 4,725,629 | 2/1988 | Garvey et al. | 521/137 |
| 4,731,391 | 3/1988 | Garvey et al. | 521/137 |
| 4,740,528 | 4/1988 | Garvey et al. | 521/128 |
| 4,940,737 | 7/1990 | Braatz et al. | 521/103 |
| 4,962,172 | 10/1990 | Allen et al. | 526/318.42 |
| 5,064,653 | 11/1991 | Sessions et al. | 424/445 |
| 5,065,752 | 11/1991 | Sessions et al. | 128/156 |
| 5,104,909 | 4/1992 | Grasel et al. | 521/159 |
| 5,110,843 | 5/1992 | Bries et al. | 521/159 |
| 5,164,421 | 11/1992 | Kiamil et al. | 521/159 |
| 5,296,518 | 3/1994 | Grasel et al. | 521/176 |

OTHER PUBLICATIONS

Dow Corning Quality Silicone Surfactants for Urethane Foams, 1983 Product Bulletin.
Dow Corning Silicone Surfactants for Urethane Foams, 1977 Product Bulletin.
MSDS for Union Carbide Silicone L–532 (1977).
Technical Data Sheet for NIAX Surfactant L–532 (OSI Specialties, Inc., Jan. 9, 1996).

*Primary Examiner*—Rachel Gorr
*Attorney, Agent, or Firm*—Connolly & Hutz

[57] ABSTRACT

Hydrophilic polyurethane foams with rapid wet out properties are formed from the reaction product of an MDI-based or polymeric MDI-based isocyanate capped prepolymer with an aqueous component, such as water, and about 0.5 to 2.0 parts by weight, based on 100 parts by weight prepolymer, of a silicone glycol copolymer liquid surfactant with a polyether portion, said surfactant having a viscosity of about 175 to 350 CST at 25° C., a molecular weight in the range of about 1500 to 20,000, with the polyether portion having a molecular weight in the range of about 200 to 2000 and containing about 40 to 100 percent by weight ethylene oxide. The surface of the hydrophilic foam wets out or absorbs droplets of water in less than thirty (30) seconds, preferably instantaneously (less than one second).

20 Claims, No Drawings

HYDROPHILIC URETHANE FOAM

BACKGROUND OF THE INVENTION

Conventional polyether and polyester polyurethane foams are hydrophobic: they do not readily absorb liquids, such as water. Certain foam applications require foams that will absorb water. Such foams are known as hydrophilic.

Hydrophilic polyurethane foams can be prepared by a "prepolymer" process in which a hydrophilic prepolymer having isocyanate end groups is mixed and reacted with water. U.S. Pat. Nos. 3,861,993 and 3,889,417 disclose a hydrophilic polyurethane foam which is formed by mixing and reacting with water an isocyanate capped polyoxyethylene glycol prepolymer using a molar ratio of $H_2O$ to NCO groups in the prepolymer of 6.5 to 390:1. Commercial hydrophilic polyurethane foams of this type, known as HYPOL® foams, are prepared by mixing and reacting the prepolymers with water. HYPOL® foam prepolymers are available from Hampshire Chemical Company.

A particular family of polyurethane prepolymers, derived from methylene diphenyl diisocyanate (MDI) and sold under the trademark HYPOL PLUS, was developed by W. R. Grace & Company and is now sold by Hampshire Chemical Company for use in an aqueous two-stage process of foam production. The prepolymers, and the aqueous two-stage process foams produced therefrom, are disclosed in U.S. Pat. No. 4,365,025. An isocyanate-containing prepolymer in which the isocyanate is a mixture of MDI and polymeric forms of MDI is foamed by mixing it with an approximately equal amount of water. The resultant flexible foams are characterized by greater hydrolytic stability than those foamed from toluene diisocyanate (TDI) prepolymers.

Wet out is generally the time interval it takes for a liquid to penetrate the foam surface. For many applications, the rate at which the foam picks up the liquids that contact the foam surface is critical. Wet out rates vary greatly for foams characterized as hydrophilic. Most hydrophilic foams do not display rapid wet out. Often other hydrophilic materials, such as fibers (See, e.g., U.S. Pat. No. 4,127,516) or superabsorbent polymers (See, e.g., U.S. Pat. No. 5,064,653) or particles (See, e.g., U.S. Pat. No. 3,224,889), must be incorporated into the HYPOL® foam structures to improve the wet out rates of such foams.

Other hydrophilic polyurethane foams have been disclosed in the art. Very few concern producing foams with improved wet out rates.

U.S. Pat. No. 3,961,629 discloses a hydrophilic polyurethane foam in which the foam pores have an applied surfactant outer coating to accelerate absorption of body fluids into the pores at medically acceptable rates. The term "medically acceptable rate" is not defined as a range of rates in the patent, although the examples show blood absorption rates of 2 to 60 seconds.

U.S. Pat. No. 4,314,034 discloses a polyurethane foamed sponge formed from the combination of a hydrophilic oxyalkylene polyol capped with isocyanate groups and 1 to 30% by weight of a polymeric polyisocyanate, such as a PAPI resin, a commercially available form of methylene diphenyl isocyanate. The prepolymers are foamed in the presence of water, reinforcing fibers, surfactants, a thickening agent and up to 40% by weight of diatomaceous earth. With the diatomaceous earth and PAPI the foam sponge has what is described as rapid wet out and improved wet strength.

U.S. Pat. No. 4,740,528 discloses an absorbent "superwicking" crosslinked polyurethane foam that has an effective amount of at least one amino acid incorporated into the foam-forming composition. The patent suggests that surfactants may be added to the foam forming composition, but that surfactants are not known to significantly contribute to the wicking properties of the foam (Col. 10, line 31).

In U.S. Pat. No. 4,191,815, hydrophilic polyurethane foams are prepared by reacting a polyol with a polyisocyanate that has NCO groups that are not bonded to an aromatic ring in the presence of effective amounts of certain catalysts, foam stabilizers and swelling agents. The resulting foams have reported wet out rates or penetrability rates generally over 30 seconds.

Surface-active materials, i.e., surfactants, are generally added to foam-forming compositions to help control the size and shape of the foam cells by stabilizing the gas bubbles formed during nucleation. Surfactants also help to control the degree of cell opening and increase the operating margin between the extremes of shrinkage or reduced permeability and foam collapse, when cell opening occurs before the reaction mixture has sufficiently polymerized beyond its "gel point." Because some surfactants are known to leach out of foams when the foams absorb liquids, some hydrophilic foams are made without addition of any surfactants (See, e.g., U.S. Pat. No. 5,296,518).

Silicone-polyether liquid copolymer surfactants are known to produce foams with small, fine cells (See, e.g., U.S. Pat. No. 5,104,909 at Col. 4, lines 1–14). It was not expected that when certain of these silicone glycol copolymer liquid surfactants were incorporated into hydrophilic foam-forming compositions, the resulting foams would have more rapid wet out.

One object of the present invention is to produce hydrophilic polyurethane foams that do not require hydrophilic fibers or other added materials foreign to the foam to increase the wet out rate of such foams.

SUMMARY OF THE INVENTION

Hydrophilic polyurethane foams that have rapid wet out are obtained by the process of (a) providing an isocyanate-capped polyether prepolymer formed from the reaction of a polyether polyol having an ethylene oxide group content above at least about fifty percent by weight with an isocyanate selected from the group consisting of methylene diphenyl isocyanate (MDI), and mixtures of MDI with polymeric MDI and/or toluene diisocyanate (TDI); and (b) adding to such prepolymer about 0.5 to 2.0 parts by weight, based on 100 parts by weight prepolymer, of a silicone glycol copolymer liquid surfactant to form a foam-forming composition, wherein said silicone glycol copolymer liquid surfactant has (1) a viscosity of about 175 to 350 CST at 25° C., (2) a molecular weight in the range of about 1500 to 20,000, (3) a polyether portion having a molecular weight in the range of about 200 to 2000, and (4) contains about 40 to 100 percent by weight ethylene oxide; and (c) foaming the prepolymer and surfactant foam-forming composition in the presence of an aqueous component, such as water or a water slurry or a water emulsion, in an amount of from about 35 to 100 parts by weight, preferably 40 to 90 parts by weight, based on 100 parts by weight prepolymer.

The hydrophilic polyurethane foam obtained by this process readily absorbs liquids, such as water, and maintains dimensional stability when wet. The wetted foam does not collapse under the combined weight of the foam and water and has desirable physical properties—e.g., wet strength and tensile strength. Moreover, the surface of the hydrophilic foam rapidly wets out, usually in less than 30 seconds, preferably in less than 5 seconds, most preferably instantaneously (in less than 1 second), when the foam is placed in contact with a liquid. The present invention concerns the foam-forming composition, the process for producing the hydrophilic foam, the hydrophilic foam formed by such process and articles of manufacture incorporating the hydrophilic foam.

Preferably, the foam-forming composition contains an isocyanate-capped prepolymer formed from about 60 to 70 percent by weight polyether polyol prereacted with about 30 to 40 percent by weight isocyanate. Such polyether polyol used to form the prepolymer further is preferably comprised of about 70 to 80 percent by weight oxyethylene units and 20 to 30 percent by weight oxypropylene units. The prepolymer may be formed from a combination of polyols.

A trifunctional initiator is incorporated into the prepolymer. Such trifunctional initiator preferably is selected from the group consisting of trimethylol propane, glycerine, trimethylol ethane, triethanol amine and pentaerythritol.

The silicone glycol copolymer liquid surfactant may be added to the foam-forming composition in any convenient manner. For example, the surfactant may be added to the prepolymer or to the aqueous component before the prepolymer and aqueous component are combined. Alternatively, the surfactant may be introduced to the mixing head at the same time the prepolymer and aqueous component are so introduced. The silicone glycol copolymer liquid surfactant is preferably added in an amount within the range of about 0.5 to about 1.2, most preferably about 1.0 part by weight based on 100 parts by weight prepolymer.

DESCRIPTION OF THE PREFERRED EMBODIMENTS

The hydrophilic polyurethane foam compositions of the present invention are prepared using an isocyanate-capped polyether prepolymer. Isocyanate-capped polyether prepolymers such as those disclosed in U.S. Pat. No. 4,137,200 are suitable for use in the present invention. These prepolymers have a defined average isocyanate functionality greater than 2. These prepolymers may be capped with aromatic isocyanates, such as, methylene diphenyl isocyanate (MDI), or mixtures of MDI with toluene diisocyanate (YDI) and/or polymeric forms of MDI. Isocyanate-capped polyether prepolymers which have been found suitable for use in the practice of the present invention include prepolymers sold by Hampshire Chemical Company the HYPOL® trademark. Examples include HYPOL FHP 3000, HYPOL FHP 2002, HYPOL FHP 3000, HYPOL FHP 4000, HYPOL FHP 5000, HYPOL X6100 and HYPOL hydrogel. The HYPOL FHP 4000 and HYPOL FHP 5000 prepolymers are derived from methylene diisocyanate.

In addition to the MDI or MDI with TDI, polymeric polyisocyanate may be incorporated into the prepolymer. The commercially available PAPI series made by Dow Chemical Company is a family of polymeric MDI produced by the reaction of carbonyl chloride with an aniline-formaldehyde condensate. The PAPI family consists of mixtures of MDI and the polymeric forms of the phenyl isocyanates that make up MDI which are linked together by methylene groups. MDI has a functionality of about 2.0 and when mixed with the phenylisocyanate trimers and tetrareefs the resulting mixtures have average functionalities from about 2.0 up to about 3.0.

Another example of an isocyanate-capped prepolymer preferably used in the present invention is ISO 247, a product of BASF Corporation. This prepolymer is formed from about two thirds polyether polyol and one third isocyanate. The polyol has about 75 percent by weight ethylene oxide and about 25 percent by weight propylene oxide with a trifunctional initiator. The isocyanate comprises a combination of methylene diphenyl diisocyanate (MDI) and other polymeric MDI. ISO 247 prepolymers have an NCO weight percent of 10.15 and a viscosity at 25° C. of 4700 cps.

The polyether polyurethane prepolymers that are preferably employed to produce the hydrophilic foams according to this invention are "hydrophilic" and will have at least 50 percent by weight oxyethylene units with the balance being oxypropylene, oxybutylene or other oxyalkylene units.

The amount of prepolymer in the reactant composition used to prepare the hydrophilic polyurethane foam composition is not particularly critical, but depends on a number of factors, including the proportion of other components in the reactant composition as described in greater detail below. There should, however, be sufficient prepolymer to form a polyurethane foam. The prepolymers may be used singly or in combination.

The prepolymer is foamed in the presence of an aqueous component, preferably water, in the conventional manner known in the art. The aqueous component may also be a water slurry or suspension, a water emulsion, or a water solution having water soluble materials disposed therein.

It has been found that adding to the foam-forming composition about 0.5 to about 2.0 parts by weight, based on 100 parts by weight prepolymer, of one or more silicone glycol copolymer liquid surfactants having (1) a molecular weight in the range of about 1500 to 20,000, preferably 1500 to 12,000, (2) a polyether portion with a molecular weight of about 200 to 2000, preferably 200 to 1500, and comprising 40 to 100 percent by weight ethylene oxide, and (3) a viscosity of about 175 to 350 CST at 25° C., surprisingly results in production of a hydrophilic foam with a rapid wet out rate. The surfactant may be premixed with the prepolymer in a first step, before the combined prepolymer and surfactant are reacted with an aqueous component. The surfactant may be combined with the aqueous component before such component is combined with the prepolymer. The surfactant may also be added to the mixing head simultaneously with the other foam-forming composition ingredients. Additional surfactants may be added to the foam forming composition so long as they do not yield a hydrophobic foam.

If desired, the foam-forming composition may also contain fillers, stabilizers, additives, such as reinforcing agents, auxiliary blowing agents, anti-microbial agents, disinfectants, medicaments, contraceptive formulations, fragrances, deodorizers, colorants, cleaners, abrasive powders and the like. Preferably, all such fillers, stabilizers, additives and the like will be substantially nonreactive with the isocyanate and hydroxy groups under the conditions of foam formulation.

In view of the above properties, the hydrophilic polyurethane foams according to the invention may be used in various personal, industrial and medical care areas. Personal products include incontinence pads, sweat bands, household sponges, etc. Industrial products include clean room wipes, pipe cleaning plugs and cleaning rollers. Medical care products include surgical sponges, wound dressings, surgical drapes, mattress covers, etc.

The following examples will aid in explaining, but should not be deemed as limiting, practice of the present invention. In all cases, unless otherwise noted, all parts and percentages are by weight.

EXAMPLES

Examples 1–9 were made according to the same procedure in which 100 parts by weight of an isocyanate-capped polyurethane prepolymer (a blended MDI and polymeric MDI-based prepolymer sold by BASF Corporation under the designation ISO 247) were mixed with a surfactant or coupling agent and then foamed in the presence of water as the aqueous component. The foaming was conducted in the laboratory on a bench scale. The prepolymer, surfactant and water were weighed into a beaker and mixed with an electric mixer for about 10 seconds. The mixture was then poured into a second beaker and allowed to rise. After curing at room temperature for 24 hours, the foam was removed from the beaker and sliced into one-half inch thick slices of circular cross section.

Wet out times were measured by dropping one droplet of water by pipette or eyedropper onto the surface of a dry foam sample from a height of one-half inch above the foam surface and monitoring the length of time required for the entire droplet to be absorbed by the foam.

Example 1

Foam-forming ingredients:
  100 parts ISO 247, an MDI/polymeric MDI-based prepolymer from BASF Corp.;
  1.0 part DABCO DC 5098, a silicone glycol copolymer surfactant for rigid urethane foams from Dow Coming that has a molecular weight in the range of 1500 to 20,000, a polyether portion with a molecular weight of 400 to 2000 and 50 to 100 mole percent ethylene oxide units, and a viscosity at 25° C. in CST of about 250;
  50.0 parts water.

The resulting hydrophilic polyurethane foam had a wet out time that was instantaneous, under 1 second.

Example 2

Foam-forming ingredients:
  100 parts ISO 247, an MDI/polymeric MDI-based prepolymer from BASF Corp.;
  1.0 part NIAX Surfactant L532, a silicone glycol copolymer surfactant for ester polyurethane foams from Osi Specialties, Inc. of Sistorsville, W.V. with a molecular weight of 1500 to 12,000 and having a polyether portion with a molecular weight of 200 to 1500;
  50.0 parts water.

The resulting hydrophilic polyurethane foam had a wet out time that was instantaneous, under 1 second.

Comparison Example 3

Foam-forming ingredients:
  100 parts ISO 247, an MDI/polymeric MDI-based prepolymer from BASF Corp.;
  50.0 parts water.

The resulting hydrophilic polyurethane foam had a wet out time of greater than five (5) minutes.

Comparison Example 4

Foam-forming ingredients:
  100 parts HYPOL 3000, a TDI-based prepolymer from Hampshire Chemical Company;
  100 parts water.

Two samples were made with these ingredients. The resulting hydrophilic polyurethane foams had wet out times of greater than three (3) minutes and greater than ten (10) minutes.

Comparison Example 5

Foam-forming ingredients:
  100 parts HYPOL 3000, a TDI-based prepolymer from Hampshire Chemical Company;
  1.0 part NIAX Surfactant L532, a silicone glycol copolymer surfactant for ester polyurethane foams from Osi Specialties, Inc. of Sistorsville, W.V. with a molecular weight of 1500 to 12,000 and having a polyether portion with a molecular weight of 200 to 1500 with 70 to 100 percent ethylene oxide;
  100 parts water.

The resulting polyurethane foam collapsed and could not be tested for wet out rate.

Comparison Example 6

Foam-forming ingredients:
  100 parts ISO 247, an MDI/polymeric MDI-based prepolymer from BASF Corp.;
  0.5 part NIAX Surfactant L620, a silicone glycol copolymer surfactant from Osi Specialties, Inc. of Sistorsville, W.V. with a molecular weight of 20,000 to 100,000, and having a polyether portion with a molecular weight in the range of 1000–4000 with 50 to 100 mole percent ethylene oxide;
  50.0 parts water.

Wet out time could not be measured because the foam structure collapsed.

Comparison Example 7

Foam-forming ingredients:
  100 parts ISO 247, an MDI/polymeric MDI-based prepolymer from BASF Corp.;
  1.0 part DABCO DC 5160, a silicone glycol copolymer surfactant for ether polyurethane foams from Dow Coming that has a molecular weight in the range of 20,000 to 80,000 and a polyether portion with a molecular weight of 1000 to 4000 and 45 to 65 mole percent ethylene oxide units;
  50.0 parts water.

The resulting hydrophilic polyurethane foam had a wet out time of 40 seconds.

Comparison Example 8

Foam-forming ingredients:
  100 parts ISO 247, an MDI/polymeric MDI-based prepolymer from BASF Corp.;
  1.0 part DABCO DC 5043, a silicone glycol copolymer surfactant for ether polyurethane foams from Dow Coming that has a molecular weight in the range of 300 to 1500, and a polyether portion with a molecular weight of 200 to 1000 and less than 40 mole percent ethylene oxide units, and a viscosity at 25° C. in CST of about 300;
  50.0 parts water.

The resulting hydrophilic polyurethane foam had a wet out time of over three (3) minutes.

Comparison Example 9

Foam-forming ingredients:
  100 parts ISO 247, an MDI-based prepolymer from BASF Corp.;
  1.0 part Fomrez F1058, a coupling agent for ester polyurethane foams from Witco Corp. (N,N-diethyloleamide);

50.0 parts water.

The resulting hydrophilic polyurethane foam had a wet out time of 45 seconds.

Comparison Example 10

Foam-forming ingredients:

100 parts ISO 247, an MDI-based prepolymer from BASF Corp.;

1.0 part Fomrez 77–86, a coupling agent for ester polyurethane foams from Witco Corp. (sulfated or sulfonated fatty acid additive of ethylene oxide and propylene oxide);

50.0 parts water.

The resulting hydrophilic polyurethane foam had a wet out time of over three (3) minutes.

Examples 11–16

Examples 11–16 were made with a pilot plant foam machine. Unless otherwise stated, all foam-forming ingredients were pumped to the mix head in separate streams. The foaming mixture was dispensed onto a moving conveyor and allowed to rise as it was conveyed away from the mix head. The foam bun produced was allowed to cure for about 24 hours. One-half inch thick slices were then cut and used for the wet out test according to the identical procedure as described for Examples 1–10 above. The ingredients and amounts and other data are reported in Table 1 below.

TABLE 1

| Example | 11 | 12 | 13 | 14 | 15 | 16 |
|---|---|---|---|---|---|---|
| ISO 247 (parts) | 100 | 100 | 100 | 100 | 100 | 100 |
| Water (parts) | 50 | 75 | 100 | 50 | 50 | 50 |
| L532 Surfactant (parts) | 1.0 | 1.1 | 1.5 | 2.0 | 0.5 | 0.75 |
| Wet-Out (seconds) | <1.0 | <1.0 | <1.0 | 2.0 | 4.0 | <1.0 |
| Tensile - Dry (psi) | 30.6 | 30.8 | 46.3 | NA | NA | 30.6 |
| Tensile - Wet (psi) | 9.1 | 6.1 | 8.5 | NA | NA | 9.1 |
| Elongation - Dry (%) | 460 | 412 | 425 | NA | NA | 460 |
| Elongation - Wet (%) | 180 | 104 | 92 | NA | NA | 180 |
| Density (Lbs/Ft$^3$) | 4.0 | 6.7 | 9.5 | NA | NA | 4.0 |
| Volume Swell (%) | 114 | 146 | 155 | NA | NA | NA |

Physical properties of the resultant foams reported in Table 1 were determined using test methods set out in ASTM D3574: Standard Test Methods for Flexible Cellular Materials. "NA" indicates that the property was not measured for the particular sample.

Numerous variations and modifications will be readily apparent to those having ordinary skill in the art without departing from either the spirit or the scope of the invention. We claim:

1. A process for producing a hydrophilic foam with rapid wet out, comprising:

providing an isocyanate capped polyoxyethylene polyol prepolymer with a reaction functionality greater than two and containing a trifunctional initiator, said prepolymer being formed from the reaction of a polyether polyol having an ethylene oxide content above fifty percent by weight with an isocyanate selected from the group consisting of methylene diphenyl diisocyanate and mixtures of methylene diphenyl diisocyanate with toluene diisocyanate or polymeric forms of methylene diphenyl diisocyanate;

adding to the prepolymer about 0.5 to about 2.0 parts by weight, based on 100 parts by weight prepolymer, of a silicone glycol copolymer liquid surfactant with a polyether portion, said surfactant having a viscosity of about 175 to 350 CST at 25° C., a molecular weight in the range of about 1500 to 20,000, with the polyether portion having a molecular weight in the range of about 200 to 2000 and containing about 40 to 100 percent by weight ethylene oxide; and foaming the prepolymer in the presence of an aqueous component in an amount from about 40 to 90 parts by weight, based on 100 parts by weight prepolymer.

2. The process of claim 1, wherein the prepolymer is formed from about 60 to 70 percent by weight polyether polyol and about 30 to 40 percent by weight isocyanate.

3. The process of claim 1, wherein the polyol comprises about 70 to 80 percent by weight ethylene oxide units and about 20 to 30 percent by weight propylene oxide units.

4. The process of claim 1, wherein about 0.8 to about 1.2 parts by weight, based on 100 parts by weight prepolymer, of silicone glycol copolymer liquid surfactant are added.

5. The process of claim 1, wherein the aqueous component is water.

6. The hydrophilic foam with rapid wet out formed by the process of claim 1.

7. A hydrophilic foam with rapid wet out comprising the reaction product of:

(a) a prepolymer formed from the reaction of a polyether polyol having an ethylene oxide content above about fifty percent by weight with an isocyanate selected from the group consisting of methylene diphenyl diisocyanate and mixtures of methylene diphenyl diisocyanate with toluene diisocyanate or polymeric forms of methylene diphenyl diisocyanate; and (b) about 0.5 to about 2.0 parts by weight, based on 100 parts by weight prepolymer, of a silicone glycol copolymer liquid surfactant with a polyether portion, said surfactant having a viscosity of about 175 to 350 CST at 25° C., a molecular weight in the range of about 1500 to 20,000, with the polyether portion having a molecular weight in the range of about 200 to 2000 and containing about 40 to 100 percent by weight ethylene oxide; and (c) about 40 to 90 parts by weight, based on 100 parts by weight prepolymer, of an aqueous component wherein when a surface of the resulting hydrophilic foam is placed in contact with a liquid, the surface wets out within less than about 30 seconds.

8. The hydrophilic foam of claim 7, wherein:

the prepolymer is formed from about 60 to 70 percent by weight polyether polyol and about 30 to 40 percent by weight isocyanate.

9. The hydrophilic foam of claim 7, wherein:

the polyol comprises about 70 to 80 percent by weight ethylene oxide units and about 20 to 30 percent by weight propylene oxide units.

10. The hydrophilic foam of claim 7, wherein:

the composition contains about 0.8 to 1.2 parts by weight, based on 100 parts by weight prepolymer, of the silicone glycol copolymer liquid surfactant.

11. The hydrophilic foam of claim 7, wherein the aqueous component is water.

12. The hydrophilic foam of claim 7, wherein a material selected from the group consisting of fillers, stabilizers, additives, auxiliary blowing agents, anti-microbial agents, disinfectants, medicaments, contraceptive formulations, fragrances, deodorizers, colorants, cleaners and abrasive powders, or a combination thereof, is added to the prepolymer or aqueous component.

13. An absorptive device comprising a hydrophilic polyurethane foam according to claim 1.

14. The absorptive device according to claim 13 in the form of a clean room wipe.

15. An absorptive device comprising a hydrophilic foam made according to the process of claim 7.

16. The absorptive device according to claim 15 in the form of a clean room wipe.

17. A hydrophilic foam-forming composition, comprising:
(a) a prepolymer formed from the reaction of a polyether polyol having an ethylene oxide content above about fifty percent by weight with an isocyanate selected from the group consisting of methylene diphenyl diisocyanate and mixtures of methylene diphenyl diisocyanate with toluene diisocyanate or polymeric forms of methylene diphenyl diisocyanate;
(b) about 0.5 to about 2.0 parts by weight, based on 100 parts by weight prepolymer, of a silicone glycol copolymer liquid surfactant with a polyether portion, said surfactant having a viscosity of about 175 to 350 CST at 25° C., a molecular weight in the range of about 1500 to 20,000, with the polyether portion having a molecular weight in the range of about 200 to 2000 and containing about 40 to 100 percent by weight ethylene oxide; and
(c) about 40 to 90 parts by weight, based on 100 parts by weight prepolymer, of an aqueous component.

18. The hydrophilic foam with rapid wet out of claim 6, wherein when a surface of the foam is placed in contact with a liquid, the surface wets out within less than about 30 seconds.

19. The hydrophilic foam with rapid wet out of claim 18, wherein when the surface of the foam is placed in contact with a liquid, the surface wets out within less than about five seconds.

20. The hydrophilic foam of claim 7, wherein when the surface of the foam is placed in contact with a liquid, the surface wets out within less than about five seconds.

* * * * *